US008103527B1

(12) United States Patent
Lasalle et al.

(10) Patent No.: US 8,103,527 B1
(45) Date of Patent: *Jan. 24, 2012

(54) MANAGING INSURANCE CLAIM DATA ACROSS INSURANCE POLICIES

(75) Inventors: Craig M. Lasalle, Los Altos, CA (US); Lisa H. Rogers, Palo Alto, CA (US); Ellen Linardi, Santa Clara, CA (US); Beth Goldman, San Francisco, CA (US); Lavanya Elangovan, San Jose, CA (US); Srinivas Singampalli, Newark, CA (US); Maureen Costello, Clarence, NY (US); Matthew J Homier, San Francisco, CA (US)

(73) Assignees: Intuit Inc., Mountain View, CA (US); Ingenix Inc., Eden Prairie, MN (US)

( * ) Notice: Subject to any disclaimer, the term of this patent is extended or adjusted under 35 U.S.C. 154(b) by 365 days.

This patent is subject to a terminal disclaimer.

(21) Appl. No.: 11/824,397

(22) Filed: Jun. 29, 2007

(51) Int. Cl.
 *G06Q 40/00* (2006.01)
(52) U.S. Cl. .............................................. 705/4; 705/35
(58) Field of Classification Search ........................ 705/4
 See application file for complete search history.

(56) References Cited

U.S. PATENT DOCUMENTS

| | | | | |
|---|---|---|---|---|
| 6,012,035 A * | 1/2000 | Freeman et al. | ................... | 705/2 |
| 6,324,516 B1 * | 11/2001 | Shults et al. | ...................... | 705/2 |
| 6,341,265 B1 * | 1/2002 | Provost et al. | ..................... | 705/4 |
| 6,826,536 B1 * | 11/2004 | Forman | ............................. | 705/4 |
| 6,934,692 B1 * | 8/2005 | Duncan | .......................... | 705/35 |
| 7,340,401 B1 * | 3/2008 | Koenig et al. | ..................... | 705/2 |
| 7,356,516 B2 * | 4/2008 | Richey et al. | .................... | 705/80 |
| 7,370,000 B2 * | 5/2008 | Sherman | ........................... | 705/4 |
| 7,395,219 B2 * | 7/2008 | Strech | ............................... | 705/4 |
| 7,438,218 B2 * | 10/2008 | Dooley et al. | ................. | 235/378 |
| 7,464,040 B2 * | 12/2008 | Joao | ................................... | 705/2 |
| 7,467,094 B2 * | 12/2008 | Rosenfeld et al. | ................ | 705/3 |
| 7,657,441 B2 * | 2/2010 | Richey et al. | ................... | 705/1.1 |
| 2002/0077867 A1 * | 6/2002 | Gittins et al. | ...................... | 705/4 |
| 2002/0091549 A1 * | 7/2002 | Provost et al. | .................... | 705/4 |
| 2003/0158759 A1 * | 8/2003 | Kannenberg | ....................... | 705/4 |
| 2003/0225690 A1 * | 12/2003 | Eaton | .............................. | 705/40 |
| 2003/0233292 A1 * | 12/2003 | Richey et al. | ................... | 705/28 |
| 2004/0153382 A1 * | 8/2004 | Boccuzzi et al. | ............... | 705/34 |
| 2004/0193456 A1 * | 9/2004 | Kellington | ........................ | 705/4 |
| 2006/0247947 A1 * | 11/2006 | Suringa | ............................. | 705/2 |
| 2007/0005404 A1 * | 1/2007 | Raz et al. | .......................... | 705/4 |
| 2007/0011031 A1 * | 1/2007 | Bregante et al. | .................. | 705/4 |
| 2007/0011032 A1 * | 1/2007 | Bregante et al. | .................. | 705/4 |
| 2007/0136100 A1 * | 6/2007 | Daugherty et al. | ............... | 705/3 |
| 2007/0136106 A1 * | 6/2007 | Hart et al. | .......................... | 705/4 |
| 2008/0059351 A1 * | 3/2008 | Richey et al. | ................... | 705/35 |
| 2008/0114620 A1 * | 5/2008 | Donnelli | ........................... | 705/4 |
| 2008/0177577 A1 * | 7/2008 | Olaniyan | .......................... | 705/3 |
| 2008/0228531 A1 * | 9/2008 | Kenedy et al. | .................... | 705/4 |
| 2009/0094071 A1 * | 4/2009 | Kwan | ............................... | 705/4 |

\* cited by examiner

*Primary Examiner* — Kirsten Apple
(74) *Attorney, Agent, or Firm* — Osha • Liang LLP

(57) ABSTRACT

A method for managing insurance claim data across insurance policies involves identifying a first insurance claim data and a second insurance claim data using pattern recognition on multiple insurance claim data associated with an insured party, where the first insurance claim data and the second insurance claim data are associated with a single insurance claim of the insured party, where the first insurance claim data is further associated with a first insurance policy, and where the second insurance claim data is further associated with a second insurance policy. The method further involves determining a financial responsibility of the insured party for the single insurance claim based on the first insurance claim data and the second insurance claim data, and presenting the financial responsibility in a graphical user interface (GUI).

30 Claims, 6 Drawing Sheets

| Claim #1234567890 | | ☒ |
|---|---|---|
| Primary Policy Name<br>1-800-000-0000<br>Claim #1234567890<br>[Show Secondary Claim] | Date of Service: 5/17/06<br>Patient: John Doe<br>Provider: Jane Doe M.D.<br>In-Network  Tel. 123-123-1234<br>San Jose Hospital | What to do<br>Click "Launch Claim Assistance" for help on updating your claim or for instructions on disputing an incorrect claim.<br>[Launch Claim Assistance] |

Insurance claim overview 302

Claim help link 310

My Responsibility = I paid $20.00 (copay) [Edit]  =  I owe Jane Doe M.D. $0.00 [Mark as Paid]
$20.00

Billing summary 304

| Service | Billed Rate | Network Rate | Insurance Paid | My Responsibility | |
|---|---|---|---|---|---|
| (i) Abd. CT scan | 150.00 | 80.00 | 60.00 | 20.00 | [$] |
| (i) Blood sugar | 50.00 | 30.00 | 10.00 | 20.00 | [$] |
| Secondary Policy Name paid | | | | (20.00) | |
| Total | $200.00 | $110.00 | $90.00 | $20.00 | |

Insurance claim details 306

| Notes [Insert Time Stamp] | ☐ Disputed  Check this box to mark the claim as disputed. Review Next Steps and the Dispute Letters for help with appropriate dispute strategies. |
|---|---|
| Capture key questions, requests, and responses. | (?)  🖨  [OK] [Cancel] |

Notes feature 308

Dispute feature 312

General interface commands 314

Graphical user interface 300

Insurance claim details 402

| Service | Billed Rate | Network Rate | Insurance Paid | My Responsibility |
|---|---|---|---|---|
| ⓘ Abd. CT scan | 150.00 | 80.00 | 60.00 | 20.00 $ |
| ⓘ Blood sugar | 50.00 | 30.00 | 10.00 | 20.00 $ |
| Secondary Policy Name paid | | | | (20.00) $ |
| Total | $200.00 | $110.00 | | |

Line item details 404

Secondary Insurance Payment
Secondary Policy Name, your secondary policy, paid $20.00 on this claim.

[ View Secondary Claim Details ]

FIGURE 5

Payment history 502

Payments ⊠

My payments to Jane Doe, M.D.     Remaining amount to pay: $20.00

| Date | Payments/Reimbursements | Memo | Tax-Adv | Amount | Delete |
|---|---|---|---|---|---|
| 9/13/06 📅 | Paid – unspecified ▶ | Copay | ▶ | 20.00 | ☐ |
| 9/17/06 📅 | Paid – other insurance policy ▶ | | ▶ | | |

Payment
Cash/Check/Credit/Debit
Available provider credit
Paid – other insurance policy
Paid – unspecified
Reimbursement
Refund from provider
Credit from provider
Refund from insurance
Never received Total: $20.00

[ OK ] [ Cancel ]

General interface commands 504

| | Claim #0000012345 | ☒ |
|---|---|---|
| Insurance claim overview 602 | Secondary Policy Name    Date of Service: 5/17/06<br>1-800-123-4567            Patient: John Doe<br>Claim #0000012345       Provider: Jane Doe M.D.<br>                                      In-Network    Tel. 123-123-1234<br>[ Show Primary Claim ]     San Jose Hospital | What to do<br>Click "Launch Claim Assistance"<br>for help on updating your claim<br>or for instructions on disputing<br>an incorrect claim.<br>[ Launch Claim Assistance ] |

| Billing summary 604 | My Responsibilty    =    I paid    −    I owe |
|---|---|
| | $20.00                    $20.00         Jane Doe M.D.<br>                             (copay)             $0.00<br>                          [ Edit ]                   [ Mark as Paid ] |

| Service | Billed Rate | Network Rate | Insurance Paid | My Responsibility |
|---|---|---|---|---|
| ⓘ Abd. CT scan | 150.00 | 80.00 | 10.00 | 70.00 [$] |
| ⓘ Blood sugar | 50.00 | 30.00 | 10.00 | 20.00 [$] |
| Primary Policy Name paid | | | | (70.00) [$] |
| Total | $200.00 | | | $1 |

Insurance claim details 606

Primary Insurance Payment
Your primary insurance paid $70.00 on this claim. Secondary Policy Name is a secondary payer on this claim.

You have more than one insurance policy (Coordination of Benefits). This policy pays second. It has taken into account the primary policy's payment for this service.

Line item details 608

Notes    [ Insert Time Stamp ]
Capture key questions, requests, and responses.

Graphical user interface 600

FIGURE 6

MANAGING INSURANCE CLAIM DATA ACROSS INSURANCE POLICIES

BACKGROUND

An insurance claim is a request for an insurance provider to assume financial responsibility for a loss covered by an insurance policy. Many different types of losses may be insured, such as damage to a vehicle or home, medical conditions, death, identity theft, loss of wages due to disability or unemployment, or any other type of insurable loss.

Often, when an insurable loss occurs, a business entity is employed to provide a service associated with the loss. For example, a doctor may be employed to provide medical treatment, an auto mechanic may be employed to repair a damaged vehicle, a building contractor may be employed to repair a damaged home, or a funeral parlor may be employed to manage funeral services. Many different types of service providers exist, and in some cases a single service provider may provide multiple services. For example, a single visit to a hospital may involve multiple medical treatments. The amount of financial responsibility covered under an insurance policy (i.e., the amount of financial responsibility assumed by the insurance provider) is generally related to the specific services provided. Thus, an insurance claim typically lists the service(s) provided and the amount(s) billed by the service provider.

In some cases, the insurance provider only assumes partial financial responsibility for a given service, and the insured party is responsible for the remaining amount. For example, medical insurance policies typically require the insured party to pay a co-pay and/or deductible corresponding to a fixed amount or percentage of the medical bill. Further, one or more services included in the insurance claim may not be covered by the insurance policy, in which case the insurance provider may reject the uncovered portion of the insurance claim and defer full financial responsibility for the uncovered portion to the insured party.

In some cases, an insured party may be enrolled in multiple insurance policies of the same type, from the same and/or different insurance providers. For example, the insured party may be enrolled in two different health insurance policies. Enrollment in multiple insurance policies may occur, for example, if the insured party is married and receives insurance coverage from her employer and through her spouse. Another example is if a child has insurance coverage from both parents or from a parent's policy and a policy purchased through the child's school.

When an insured party is enrolled in multiple insurance policies of the same type (from the same and/or different insurance providers), one of the insurance policies is typically referred to as the "primary" insurance policy. The other insurance policies are then referred to as "secondary," "tertiary," etc. Generally, the primary insurance policy is the first recourse when filing an insurance claim. However, if the primary insurance policy does not cover the entire amount of the insurance claim, some or all of the remaining financial responsibility may be covered by the secondary insurance policy.

In some cases, the insured party (or a service provider on the insured party's behalf) may be required to file multiple insurance claim documents, for each insurance policy associated with the insurance claim. Nonetheless, the combination of filings for each insurance policy may be viewed as a single insurance claim. The use of multiple insurance policies for a single insurance claim is generally referred to as "coordination of benefits," and allows the insured party to ultimately reduce their financial responsibility for the insurance claim.

In cases where coordination of benefits is used, the burden generally falls on the insured party to determine the remaining financial responsibility for the insurance claim. Typically, this is accomplished by the insured party maintaining a physical set of insurance-related documentation, such as mailed insurance statements, service providers' bills, or any other type of insurance-related documentation. When an insurance provider (e.g., the insurance provider for a primary and/or secondary insurance policy) mails updated information about the insurance claim to the insured party, the insured party must physically compare the most recent mailing with earlier documentation to determine whether financial responsibility has changed.

SUMMARY

In general, in one aspect, the invention relates to a method for managing insurance claim data across insurance policies. The method comprises identifying a first insurance claim data and a second insurance claim data using pattern recognition on a plurality of insurance claim data associated with an insured party, wherein the first insurance claim data and the second insurance claim data are associated with a single insurance claim of the insured party, wherein the first insurance claim data is further associated with a first insurance policy, and wherein the second insurance claim data is further associated with a second insurance policy. The method further comprises determining a financial responsibility of the insured party for the single insurance claim based on the first insurance claim data and the second insurance claim data, and presenting the financial responsibility in a graphical user interface (GUI).

In general, in one aspect, the invention relates to an insurance claim management system comprising an insurance claim data repository configured to store a plurality of insurance claim data associated with an insured party. The insurance claim management system further comprises an insurance claim data manager configured to identify a first insurance claim data and a second insurance claim data using pattern recognition on the plurality of insurance claim data associated with the insured party, wherein the first insurance claim data and the second insurance claim data are associated with a single insurance claim of the insured party, wherein the first insurance claim data is further associated with a first insurance policy, and wherein the second insurance claim data is further associated with a second insurance policy. The insurance claim data manager is further configured to determine a financial responsibility of the insured party for the single insurance claim based on the first insurance claim data and the second insurance claim data, and present the financial responsibility in a graphical user interface (GUI).

In general, in one aspect, the invention relates to a graphical user interface (GUI) presenting insurance claim data to an insured party. The GUI comprises a first insurance claim data and a second insurance claim data, wherein the first insurance claim data and the second insurance claim data are associated with a single insurance of the insured party, wherein the first insurance claim data is further associated with a first insurance policy, and wherein the second insurance claim data is further associated with a second insurance policy. The GUI further comprises a financial responsibility of the insured party for the single insurance claim, wherein the total financial responsibility is based on the first insurance claim data and the second insurance claim data.

In general, in one aspect, the invention relates to a computer readable medium. The computer readable medium comprises executable instructions to identify a first insurance claim data and a second insurance claim data using pattern recognition on a plurality of insurance claim data associated with an insured party, wherein the first insurance claim data and the second insurance claim data are associated with a single insurance claim of the insured party, wherein the first insurance claim data is further associated with a first insurance policy, and wherein the second insurance claim data is further associated with a second insurance policy. The computer readable medium further comprises executable instructions to determine a financial responsibility of the insured party for the single insurance claim based on the first insurance claim data and the second insurance claim data, and present the financial responsibility in a graphical user interface (GUI).

Other aspects of the invention will be apparent from the following description and the appended claims.

BRIEF DESCRIPTION OF DRAWINGS

FIGS. 3-6 show diagrams of a graphical user interface in accordance with one or more embodiments of the invention.

DETAILED DESCRIPTION

Figure 1:
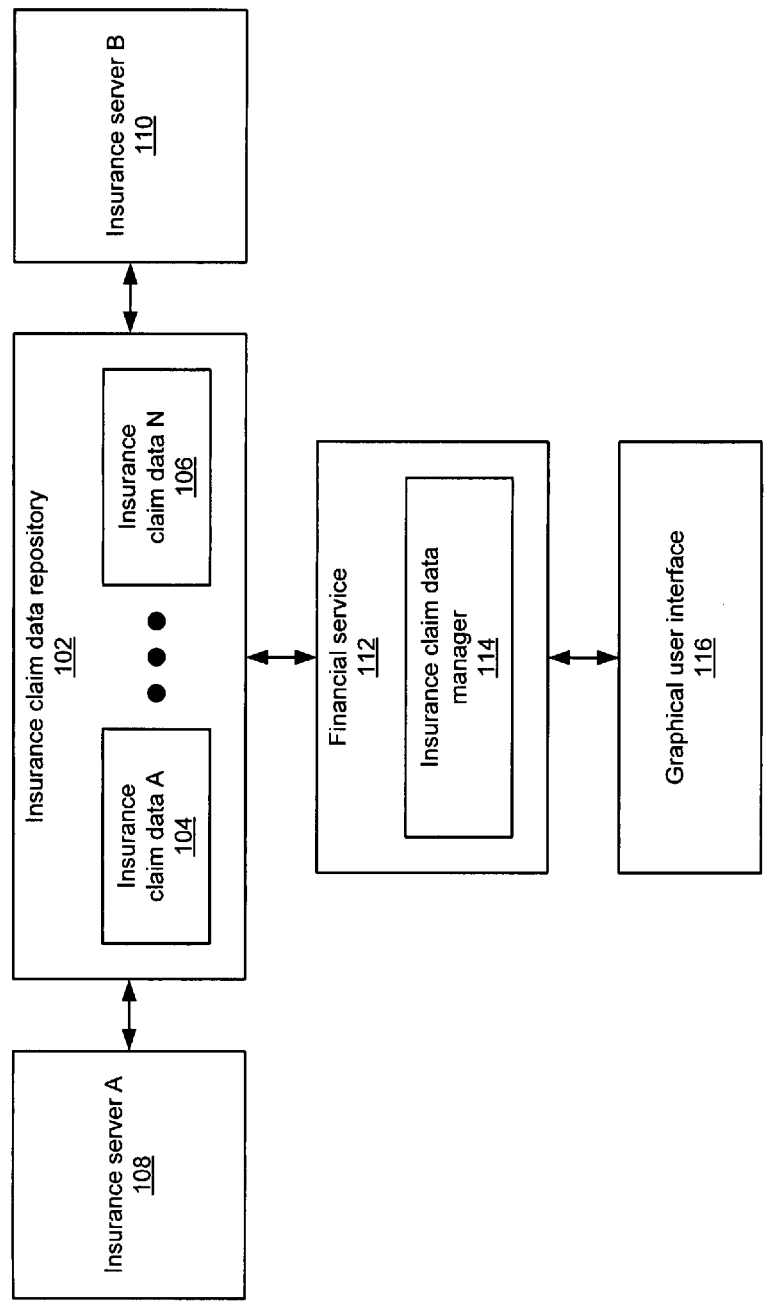
FIG. 1 shows a diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for managing insurance claim data across insurance policies. Insurance claim data associated with an insured party is obtained from one or more insurance server(s). Pattern matching is performed on the insurance claim data to identify related insurance claim data, i.e., insurance claim data relating to a single insurance claim. The related insurance claim data is used to determine the insured party's financial responsibility for the insurance claim, and the insured party's financial responsibility is then presented to a user.

FIG. 1 shows a diagram of a system in accordance with one or more embodiments of the invention. The system includes one or more insurance server(s) (e.g., insurance server A (108), insurance server B (110)) configured to provide insurance claim data (e.g., insurance claim data A (104), insurance claim data N (106)) for storage in an insurance claim data repository (102). The insurance claim data repository (102) may be a database, an extensible markup language (XML) file, a text file, a spreadsheet, or any other type of data repository. In one or more embodiments, the insurance claim data repository (102) is stored in a data server (not shown) communicatively coupled with the insurance server(s).

The insurance claim data includes data describing insurance claims, such as the insurance policy's name, the insurance provider's name and/or contact information, the insurance claim number, the date of service, the service provider's name and/or contact information, the insured party's name and/or contact information, the date the insurance claim was processed by the insurance provider, the type of service(s) provided, the amount billed for each service, the amount covered by the insurance policy, the amount paid by the insurance provider, the insured party's financial responsibility, any other type of data associated with insurance claims, or any combination thereof.

The system also includes a financial service (112) configured to access the insurance claim data repository (102) and obtain insurance claim data. The financial service (112) includes an insurance claim data manager (114) configured to identify related insurance claim data and use the related insurance claim data to determine the insured party's financial responsibility for an insurance claim. The financial service (112) may be a hosted service (e.g., a web service or any other type of backend service), an execution thread in a stand-alone end-user application, any other type of service, or any combination thereof. Depending on the type of service used, the insurance claim data manager (114) may be a package, a class, a method, an executable file, any other type of service component, or any combination thereof.

Further, the financial service (112) is configured to provide results from the insurance claim data manager (114) for display in a graphical user interface (GUI) (115). The GUI (116) may be a web page, a window in a stand-alone end-user application, a display on a mobile device (e.g., a personal digital assistant (PDA), a cellular telephone, or any other type of mobile device), or any other type of interactive computer display. More specifically, the GUI (116) is configured to display the insured party's financial responsibility for an insurance claim in the context of related insurance claim data.

In one or more embodiments, the insurance server(s) is/are hosted by one or more insurance providers, while the insurance claim data repository (102) and financial service (112) may be hosted by a third-party financial services provider. Further, if the insured party has insurance policies through multiple insurance providers, then one of the insurance servers may be hosted by a primary insurance provider (i.e., the provider of the primary insurance policy), and another of the insurance servers may be hosted by a secondary insurance provider (i.e., the provider of the secondary insurance policy).

Alternatively, any other system configuration may be used. For example, the insurance server(s), insurance claim data repository (102), and financial service (112) may all be hosted by an insurance provider. Further, the elements may be communicatively coupled via any type of network connection, or any combination thereof. The specific system configuration used may be motivated by any number of factors, such as business agreements, technical constraints, etc. Accordingly, embodiments of the invention should not be considered limited to any specific system configuration.

Figure 2:
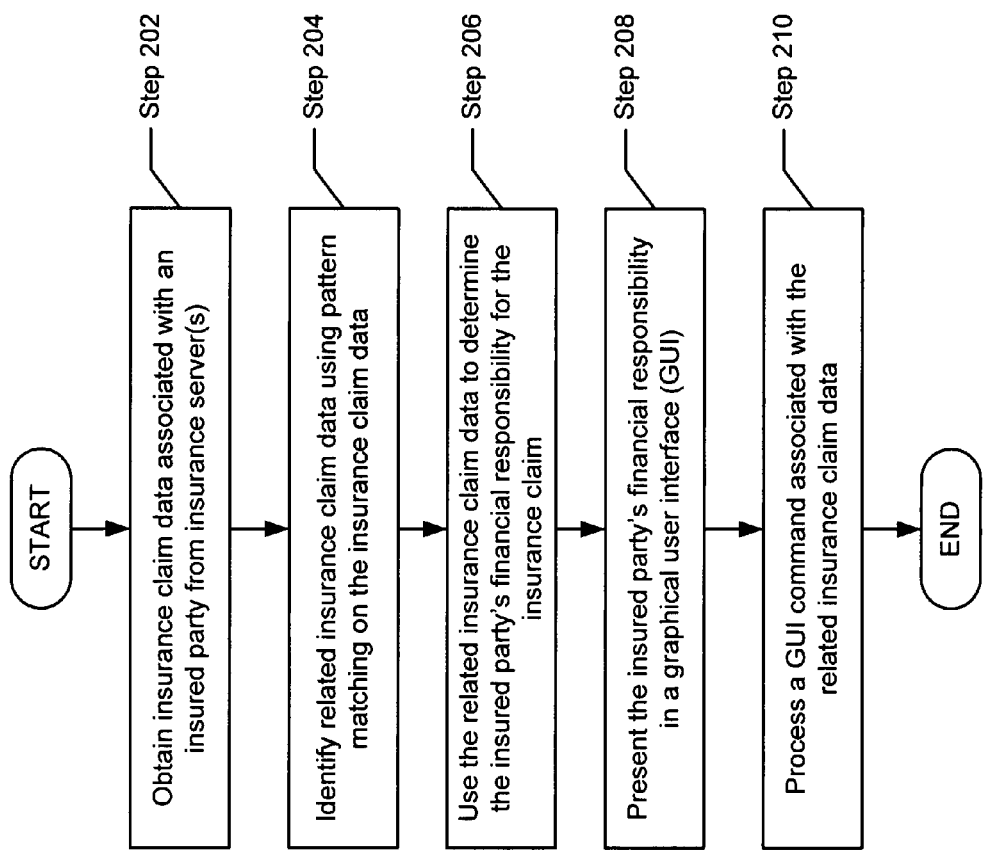
FIG. 2 shows a flowchart of a method for managing insurance claim data across insurance policies in accordance with one or more embodiments of the invention.
Figure 7:
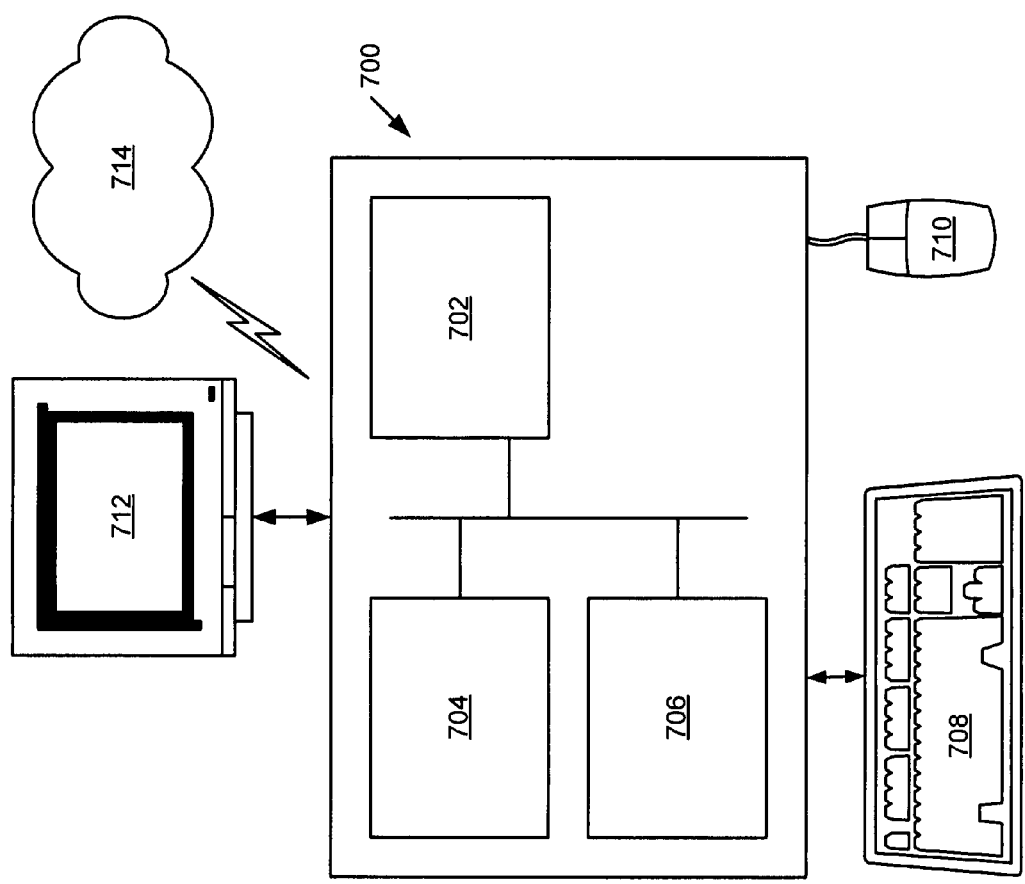
FIG. 7 shows a diagram of a computer system in accordance with one or more embodiments of the invention.

FIG. 2 shows a flowchart of a method for managing insurance claim data across insurance policies in accordance with one or more embodiments of the invention. In one or more embodiments, one or more of the steps shown in FIG. 2 may be omitted, repeated, and/or performed in a different order. Accordingly, the specific arrangement of steps shown in FIG. 2 should not be construed as limiting the scope of the invention.

In one or more embodiments, in Step 202, insurance claim data associated with an insured party is obtained from one or more insurance server(s) (e.g., insurance server A (108) and insurance server B (110) of FIG. 1). As noted above, one insurance server may be associated with a primary insurance provider, while another insurance server may be associated with a secondary insurance provider. Those skilled in the art will appreciate that a single insured party may have multiple insurance policies with the same insurance provider.

Further, the insured party may be an individual, a family, a business, or any other type of insurable entity. In one or more embodiments, obtaining the insurance claim data involves querying the insurance server(s) for insurance claim data associated with the insured party, and receiving the insurance claim data in response to the query. The insurance claim data obtained from the insurance server(s) may then be stored in an insurance claim data repository (e.g., insurance claim data repository (102) of FIG. 1).

In one or more embodiments, in Step 204, pattern matching is performed on the insurance claim data to identify related insurance claim data, i.e., insurance claim data relating to a single insurance claim. More specifically, the related insurance claim data may include insurance claim data for both a primary insurance policy and a secondary insurance policy. In one or more embodiments, the pattern matching is performed by an insurance claim data manager in a financial service (e.g., insurance claim data manager (114) of FIG. 1).

In one or more embodiments, the pattern matching involves iterating through the related insurance claim data and comparing one or more designated fields in the insurance claim data. For example, different insurance providers may agree on a standardized identity field, where related insurance claim data from different insurance providers includes the same identity field. Alternatively (for example, if an identity field is not available), other fields may be used to make a "best guess" determination that two or more insurance claim data are related. For example, the pattern matching may identify insurance claim data having an identical date of service, individual receiving the service (who may not be the principal insured party), service provider, any other insurance claim data field, or any combination thereof. In one or more embodiments, relationships identified using a "best guess" method may be presented to a user for approval or rejection.

In one or more embodiments, in Step 206, the related insurance claim data is used to determine the insured party's financial responsibility for the insurance claim. As discussed above, coordination of benefits may be used to submit the same insurance claim for multiple insurance policies. Thus, the insured party's financial responsibility may depend on the financial responsibility assumed by each insurance policy (e.g., a primary insurance policy and a secondary insurance policy). Therefore, two or more of the related insurance claim data may indicate financial responsibilities assumed by different insurance policies for the same insurance claim. Accordingly, determining the insured party's financial responsibility involves determining how much total financial responsibility has been assumed by the insurance policies, where the insured party is responsible for the remaining amount.

In one or more embodiments, in Step 208, the insured party's financial responsibility is displayed in a GUI (e.g., GUI (114) of FIG. 1). Further, in Step 210, a GUI command associated with the related insurance claim data may be processed, in response to user input via the GUI. Examples of GUI commands are discussed below with respect to FIGS. 3-6.

FIGS. 3-6 show diagrams of graphical user interfaces in accordance with one or more embodiments of the invention. These graphical user interfaces are provided for exemplary purposes only, and should not be construed as limiting the scope of the invention. For example, in one or more embodiments, one or more of the elements shown in FIGS. 3-5 may have a different visual appearance or may be omitted altogether. Further, many different types of display elements and/or GUI controls may be used to implement functionality described below.

FIG. 3 shows a diagram of a GUI (300) configured to display insurance claim data. Specifically, the GUI (300) is configured to display information about the most recent status of an insurance claim, including the insured party's current financial responsibility, based on processing of related insurance claim data, as described above. In one or more embodiments, the GUI (300) is designed to be presented directly to the insured party, so that the insured party can take an appropriate action concerning the insurance claim. Those skilled in the art will appreciate that the GUI (300) may be presented to a variety of users, such as customer service representatives, legal guardians, third party administrators, etc.

In one or more embodiments, the GUI (300) includes an insurance claim overview (302). The insurance claim overview (302) includes general information about the insurance claim, which may include information about the insurance policy under which the claim was submitted (e.g., the name of the insurance policy, the insurance provider's name and/or contact information, etc.). The insurance claim overview (302) may also include the insurance claim number assigned by the insurance provider, the date of service(s), the service provider's name and/or contact information, the insured party's name, a general history of the insurance claim (e.g., whether the insurance claim has been adjusted and/or reprocessed), any other type of general insurance claim information, or any combination thereof.

In this example, the GUI (300) mainly provides information about the primary insurance policy. That is, although the financial responsibilities presented in the GUI (300) take into account payments by a secondary insurance policy, details about the insurance claim (e.g., the insurance policy name, contact information, insurance claim number, etc.) are presented from the perspective of the primary insurance policy. An example of a graphical user interface from the perspective of a secondary insurance policy is shown in FIG. 6.

Continuing with discussion of FIG. 3, in one or more embodiments, the GUI (300) includes a billing summary (304). The billing summary (304) provides a summary of the insured party's financial responsibility for all services included in the insurance claim. For example, the billing summary (304) may list the insured party's total financial responsibility, the amount (if any) of the financial responsibility that the insured party has already paid, and the amount of the financial responsibility remaining. In one or more embodiments, the billing summary (304) includes a control to open an interface (not shown) for editing (i.e., increasing or decreasing) the amount the insured party has paid. This interface may also allow a user to submit a payment to a service provider via some type of electronic payment service. In one or more embodiments, editing the amount paid results in a corresponding change of the amount remaining. Further, the billing summary may include a control for marking the entire amount as paid.

In one or more embodiments, the GUI (300) includes insurance claim details (306) about the insurance claim. Generally, the insurance claim details (306) include details about the specific service(s) provided and the financial responsibilities associated with the insurance claim (i.e., financial responsibilities for the primary insurance policy, the secondary insurance policy, and/or the insured party). For example, the insurance claim details (306) may include names of the service(s) included in the insurance claim, the amount(s) billed by the service provider for each service, the amount(s) allowed by the insurance provider(s) for each service, the amounts the insurance provider(s) has/have paid to the service provider and/or the insured party, the insured party's financial responsibility for each service, any other similar details about the insurance claim, or any combination thereof. The insurance claim details (306) may also include totals for one or more of the aforementioned values.

Further, in one or embodiments, the insurance claim details (306) include commands to view detailed descriptions (not shown) of the service(s) listed. For example, FIG. 3 shows information icons to the left of each service name, which may each be linked to detailed descriptions of some or all of the services. The insurance claim details (306) may also include links for viewing line item details about each line item. Line item details are discussed in detail below with respect to FIG. 4.

In one or more embodiments, the GUI (300) includes a notes feature (308). The notes feature (308) allows a user to manually record information about the insurance claim. For example, if the user speaks with a customer service representative (CSR) for an insurance provider (e.g., the provider of the primary insurance policy and/or the secondary insurance policy), the user may use notes feature (308) to take notes about the conversation. The user may also take notes when speaking with a CSR for a service provider. In one or more embodiments, the notes feature (308) includes a time stamp button for automatically entering the current date and time into the textbox.

In one or more embodiments, the GUI (300) includes a dispute feature (312). The dispute feature (312) allows the user to indicate, via a checkbox or similar control, whether the insurance claim has been disputed. The dispute feature (312) may also include a link to a dispute letter generator (not shown), where the dispute letter generator is configured to automatically populate a dispute letter with relevant insurance claim data. For example, the dispute letter may be automatically populated with the name of the insured party, the claim number, the date of service, any other type of information typically included in a dispute letter, or any combination thereof. Thus, the dispute feature (312) may allow the user to generate a dispute letter for the insurance claim with minimal input required. In one or more embodiments, dispute letters generated by the dispute feature (312) are specific to the particular insurance policy represented in the insurance claim overview (302)—in this case, the primary insurance policy. In one or more embodiments, the dispute letter generator also allows the user to generate letters to service providers.

In one or more embodiments, the GUI (300) includes a claim help link (310). The claim help link (310) is a command to view a help interface (not shown) providing information about common insurance claim questions. For example, the help interface may provide guidance on verifying that the displayed financial responsibilities are correct, how to dispute an insurance claim, any other type of claim-related issues or combination thereof. In one or more embodiments, guidance provided by the claim help link (310) is contextual, i.e., targeted at the specific circumstances of the claim being viewed.

In one or more embodiments, the GUI (300) includes general interface commands (314), which are commands not specifically associated with any particular element of the GUI (300). For example, the general interface commands (314) may include a command to view a general help interface (not shown) providing information about how to use the various elements included in the GUI (300). Further, the general interface commands (314) may include a command to print insurance claim data displayed in the GUI (300).

In one or more embodiments, the general interface commands (314) include an "OK" button for accepting any changes to the GUI (300) (e.g., changes to the amount paid, notes, dispute checkbox, etc.). The general interface commands (314) may also include a "Cancel" button for cancelling any such changes to the GUI (300). In one or more embodiments, selecting the "OK" button and/or the "Cancel" button closes the GUI (300), and may transfer the user to a different interface (not shown), such as a different web page if the GUI (300) is displayed in a web browser.

In one or more embodiments, information entered by the user into the GUI (300) (e.g., notes, payment amounts, disputes, etc.) is stored along with other insurance claim data in an insurance claim data repository (e.g., insurance claim data repository (104) of FIG. 1). Further, information entered by the user may be communicated to an insurance server (e.g., insurance server A (108) and/or insurance server B (110) of FIG. 1). In other words, the GUI (300) may allow the user to store and/or modify information about the insurance claim that is then accessible to other interested parties (e.g., insurance provider(s), service provider(s), a customer service representative, etc.).

FIG. 4 shows a diagram of insurance claim details (402) in accordance with one or more embodiments of the invention. Specifically, FIG. 4 shows an example where the financial responsibilities for an insurance claim have been shared by a primary insurance policy and a secondary insurance policy via coordination of benefits. In this example, as shown in the line item details (404), the secondary insurance policy has already covered $20.00 for this particular insurance claim. Thus, the insured party's remaining financial responsibility for the insurance claim is only $20.00. The line item details (404) may also include a command for viewing details about the secondary insurance policy's financial responsibility.

As discussed above with respect to FIG. 3, a graphical user interface (e.g., GUI (300) of FIG. 3) may include a control to open an interface for editing (i.e., increasing or decreasing) the amount the insured party has paid. For example, FIG. 5 shows a diagram of a payment history (502) in accordance with one or more embodiments of the invention. In one or more embodiments, the payment history (502) allows the user to view and/or edit details about payments associated with the insurance claim.

For example, the user may be able to enter the date of a payment, the type of payment (e.g., whether the payment is to an insurance provider or a reimbursement to the insured party, whether the payment was made by cash, check, or credit card, etc.). Many different payment types exist. The user may also be able to enter a memo about the payment, whether any particular tax advantage is associated with the payment, the amount of the payment, any other type of payment information, or any combination thereof. Further, the user may be able to delete payment entries.

In one or more embodiments, the payment history (502) includes general interface commands (504), which may be similar to those discussed above with respect to FIG. 3. In one or more embodiments, an "OK" button may be used to accept any changes made to the payment history (502), and accepted changes may then be reflected in another graphical user interface (e.g., GUI (300) of FIG. 1). Further, accepted changes may be stored in an insurance claim data repository.

As discussed above, FIG. 3 shows a diagram of a GUI that includes information specific to a primary insurance policy. FIG. 6 shows a diagram of a corresponding GUI (600) that is specific to the secondary insurance policy. Specifically, although the billing summary (604) in this embodiment of the invention is the same as in FIG. 3, the insurance claim overview (602) includes information about the secondary insurance policy. Further, the insurance claim details (606) and line item details (608) are from the perspective of the secondary insurance policy.

In one or more embodiments, insurance policy-specific GUIs (e.g., as shown in FIGS. 3 and 6) allow for insurance policy-specific commands (e.g., a dispute feature), which may facilitate communication with insurance provider(s) for the user. Alternatively, information for all insurance policies associated with a specific insurance claim may be presented in a single graphical user interface, and different commands may be presented for dealing with different insurance policies.

Embodiments of the invention provide a GUI that may be presented directly to the insured party. Thus, embodiments of the invention allow the insured party to easily determine financial responsibility for an insurance claim, in the context of related insurance claim data. In particular, insurance claim data relating to a coordination of benefits may be automatically reconciled by a computer system, without requiring the insured party to manually search through physical insurance-related documentation. The insured party may also be able to view the history of the insurance claim. Thus, embodiments of the invention reduce the amount of ambiguity generally associated with coordination of benefits, thereby facilitating management of insurance claim data by the insured party.

Further, one or more embodiments of the GUI include functionality to not only view financial responsibility associated with an insurance claim, but also to control information about the insurance claim. Controllable information may include payment histories, notes about the insurance claim, dispute histories, or any other type of information about the insurance claim. Thus, the GUI may effectively provide the insured party some degree of control over their own insurance claim. Moreover, information generated and/or modified by the insured party in the GUI may then be stored in an insurance claim data repository and/or communicated to insurance server(s), for access by other interested parties.

Embodiments of the invention may be implemented on virtually any type of computer regardless of the platform being used. For example, as shown in FIG. 6, a computer system (700) includes a processor (702), associated memory (704), a storage device (706), and numerous other elements and functionalities typical of today's computers (not shown). The computer (700) may also include input means, such as a keyboard (708) and a mouse (710), and output means, such as a monitor (712). The computer system (700) may be connected to a network (714) (e.g., a local area network (LAN), a wide area network (WAN) such as the Internet, or any other similar type of network) via a network interface connection (not shown). Those skilled in the art will appreciate that these input and output means may take other forms.

Further, those skilled in the art will appreciate that one or more elements of the aforementioned computer system (700) may be located at a remote location and connected to the other elements over a network. Further, embodiments of the invention may be implemented on a distributed system having a plurality of nodes, where each portion of the invention (e.g., insurance server(s), insurance claim data repository, financial service, GUI, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for determining a financial responsibility, comprising:
   accessing, by a software application operated by a party selected from a group consisting of a patient and a relative of the patient, a repository of a plurality of medical insurance providers, wherein the software application is executing on a hardware processor;
   searching, by the software application operated by the party, a plurality of entries in the repository based on a date;
   retrieving, in response to searching and by the software application operated by the party, a first entry in the repository identifying the date, a medical procedure performed on the patient, a cost of the medical procedure, and a first amount paid by a primary medical insurance policy for the medical procedure;
   retrieving, in response to searching and by the software application operated by the party, a second entry in the repository identifying the date, the medical procedure, and a second amount paid by a secondary medical insurance policy for the medical procedure;
   calculating, by the software application operated by the party, a financial responsibility of the party to a medical service provider for the medical procedure by subtracting the first amount paid by the primary medical insurance policy and the second amount paid by the secondary medical insurance policy from the cost of the medical procedure; and
   generating, by the software application operated by the party, a graphical user interface (GUI) comprising the financial responsibility of the party.

2. The method of claim 1, further comprising:
   presenting the first amount paid and the second amount paid in the GUI.

3. The method of claim 1, further comprising:
   processing a GUI command associated with the financial responsibility.

4. The method of claim 3, wherein the GUI command comprises editing an amount of the financial responsibility of the party already paid by the party.

5. The method of claim 3, wherein the GUI command comprises recording a note associated with the medical procedure, wherein the note is stored in the first entry.

6. The method of claim 3, wherein the GUI command comprises marking the financial responsibility as disputed.

7. The method of claim 3, wherein the GUI command comprises generating a dispute letter.

8. A system for determining a financial responsibility comprising:
   a hardware processor;

a repository storing a plurality of medical insurance providers;

an insurance claim data manager (ICDM), operated by a party selected from a group consisting of a patient and a relative of the patient, the ICDM executing on the hardware processor and configured to:

access the repository of the plurality of medical insurance providers;

search a plurality of entries in the repository based on a date;

retrieve, in response to searching, a first entry in the repository identifying the date, a medical procedure performed on the patient, a cost of the medical procedure, and a first amount paid by a primary medical insurance policy for the medical procedure;

retrieve, in response to searching, a second entry in the repository identifying the date, the medical procedure, and a second amount paid by a secondary medical insurance policy for the medical procedure;

calculate a financial responsibility of the insured party to a medical service provider for the medical procedure by subtracting the first amount paid by the primary medical insurance policy and the second amount paid by the secondary medical insurance policy from the cost of the medical procedure; and generate a graphical user interface (GUI) comprising the financial responsibility of the party.

9. The system of claim 8, wherein the insurance claim data manager is further configured to:
present the first amount paid and the second amount paid in the GUI.

10. The system of claim 8, wherein the insurance claim data manager is further configured to:
process a GUI command associated with the financial responsibility.

11. The system of claim 10, wherein the GUI command comprises editing an amount of the financial responsibility of the party already paid by the party.

12. The system of claim 10, wherein the GUI command comprises recording a note associated with the medical procedure, wherein the note is stored in the first entry.

13. The system of claim 10, wherein the GUI command comprises marking the financial responsibility as disputed.

14. The system of claim 10, wherein the GUI command comprises generating a dispute letter.

15. A non-transitory computer readable medium storing instructions for determining a financial responsibility, the instructions executable on a processor and comprising functionality for:

accessing, for a party selected from a group consisting of a patient and a relative of the patient, a repository of a plurality of medical insurance providers;

searching a plurality of entries in the repository based on a date;

retrieving a first entry in the repository identifying the date, a medical procedure performed on the patient, a cost of the medical procedure, and a first amount paid by a primary medical insurance policy for the medical procedure;

retrieving a second entry in the repository identifying the date, the medical procedure, and a second amount paid by a secondary medical insurance policy for the medical procedure;

calculating a financial responsibility of the party to a medical service provider for the medical procedure by subtracting the first amount paid by the primary medical insurance policy and the second amount paid by the secondary medical insurance policy from the cost of the medical procedure; and generating a graphical user interface (GUI) comprising the financial responsibility of the party.

16. The non-transitory computer readable medium of claim 15, the instructions further comprising functionality for:
presenting the first amount paid and the second amount paid in the GUI.

17. The non-transitory computer readable medium of claim 15, the instructions further comprising functionality for:
processing a GUI command associated with the financial responsibility.

18. The non-transitory computer readable medium of claim 17, wherein the GUI command comprises editing an amount of the financial responsibility of the party already paid by the party.

19. The non-transitory computer readable medium of claim 17, wherein the GUI command comprises recording a note associated with the medical procedure, wherein the note is stored in the first entry.

20. The non-transitory computer readable medium of claim 17, wherein the GUI command comprises marking the financial responsibility as disputed.

21. The non-transitory computer readable medium of claim 17, wherein the GUI command comprises generating a dispute letter.

22. The method of claim 1, further comprising:
presenting the GUI to a third party administrator.

23. The system of claim 8, wherein the insurance claim data manager is further configured to:
present the GUI to a third party administrator.

24. The non-transitory computer readable medium of claim 15, the instructions further comprising functionality for:
presenting the GUI to a third party administrator.

25. The method of claim 1, further comprising:
generating a request to the primary medical insurance provider of the plurality of medical insurance providers for a refund.

26. The method of claim 1, further comprising:
generating a request to the primary medical insurance provider of the plurality of medical insurance providers for a credit.

27. The system of claim 8, wherein the insurance claim data manager is further configured to:
generate a request to the primary medical insurance provider of the plurality of medical insurance providers for a refund.

28. The system of claim 8, wherein the insurance claim data manager is further configured to:
generate a request to the primary medical insurance provider of the plurality of medical insurance providers for a credit.

29. The non-transitory computer readable medium of claim 15, the instructions further comprising functionality for:
generating a request to the primary medical insurance provider of the plurality of medical insurance providers for a refund.

30. The non-transitory computer readable medium of claim 15, the instructions further comprising functionality for:
generating a request to the primary medical insurance provider of the plurality of medical insurance providers for a credit.

* * * * *

UNITED STATES PATENT AND TRADEMARK OFFICE
CERTIFICATE OF CORRECTION

| | | |
|---|---|---|
| PATENT NO. | : 8,103,527 B1 | Page 1 of 1 |
| APPLICATION NO. | : 11/824397 | |
| DATED | : January 24, 2012 | |
| INVENTOR(S) | : Craig M. Lasalle et al. | |

It is certified that error appears in the above-identified patent and that said Letters Patent is hereby corrected as shown below:

- In Claim 8, Column 11 (line 20), the word "insured" should be deleted.

Signed and Sealed this
Twentieth Day of March, 2012

David J. Kappos
*Director of the United States Patent and Trademark Office*